(12) United States Patent
Popp et al.

(10) Patent No.: US 10,087,834 B2
(45) Date of Patent: Oct. 2, 2018

(54) DEVICE FOR CHANGING A COMPRESSION RATIO OF A CYLINDER UNIT OF A RECIPROCATING PISTON COMBUSTION ENGINE

(71) Applicant: SCHAEFFLER TECHNOLOGIES AG & CO. KG, Herzogenaurach (DE)

(72) Inventors: Markus Popp, Frensdorf (DE); Andreas Moeller, Nuremberg (DE); Swen Doerrie, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 75 days.

(21) Appl. No.: 15/505,186

(22) PCT Filed: Jun. 16, 2015

(86) PCT No.: PCT/DE2015/200371
§ 371 (c)(1),
(2) Date: Feb. 20, 2017

(87) PCT Pub. No.: WO2016/026486
PCT Pub. Date: Feb. 25, 2016

(65) Prior Publication Data
US 2017/0268422 A1    Sep. 21, 2017

(30) Foreign Application Priority Data
Aug. 20, 2014  (DE) .......................... 10 2014 216 533

(51) Int. Cl.
*F02B 75/32* (2006.01)
*F02B 75/04* (2006.01)
(Continued)

(52) U.S. Cl.
CPC .............. *F02B 75/047* (2013.01); *F16C 3/28* (2013.01); *F16D 41/067* (2013.01)

(58) Field of Classification Search
CPC ......... F02B 75/047; F16C 3/28; F16D 41/067
(Continued)

(56) References Cited

U.S. PATENT DOCUMENTS 1,987,661 A * 1/1935 Blauvelt ................... F16C 3/28
                                                       123/48 B
5,960,750 A   10/1999 Kreuter
(Continued)

FOREIGN PATENT DOCUMENTS

DE         19703948 C1    6/1998
DE       102008032665 A1  1/2010
(Continued)

OTHER PUBLICATIONS

International Search Report for International Application No. PCT/DE2015/200371 dated Sep. 15, 2015.

*Primary Examiner* — Marguerite McMahon
(74) *Attorney, Agent, or Firm* — Brooks Kushman P.C.

(57) ABSTRACT

A device for changing a compression ratio of a cylinder unit of a reciprocating piston combustion engine is provided. An eccentric bushing is rotatably arranged in a receiving bore hole of a bearing eye of a connecting rod ("conrod"). The conrod bearing eye is formed by a conrod upper part and a conrod lower part, and which surrounds a crankpin of a crankshaft. In addition, the eccentric bushing is rotatably guided in the receiving bore hole and can be locked preferably in two positions which are offset from one another by approximately 180° in the circumferential direction of the eccentric bushing. In order to achieve a targeted rotation of the eccentric bushing in the bore hole of the conrod bearing eye between the locking positions, a freewheel is arranged between an outer casing surface of the eccentric bushing and the receiving bore hole of the conrod bearing eye.

16 Claims, 4 Drawing Sheets

(51) Int. Cl.
*F16C 3/28* (2006.01)
*F16D 41/067* (2006.01)

(58) Field of Classification Search
USPC .............................................. 123/48 B, 78 E
See application file for complete search history.

(56) References Cited

U.S. PATENT DOCUMENTS

| | | | |
|---|---|---|---|
| 6,412,453 B1 * | 7/2002 | Rao ....................... | F02B 75/045 123/48 B |
| 2003/0209219 A1 * | 11/2003 | Klomp .................. | F02B 75/045 123/197.4 |
| 2005/0126518 A1 * | 6/2005 | Dow ..................... | F02B 75/045 123/48 B |

FOREIGN PATENT DOCUMENTS

| | | |
|---|---|---|
| DE | 102012221717 A1 | 5/2014 |
| EP | 0066350 A2 | 12/1982 |
| EP | 2620614 A1 | 7/2013 |

* cited by examiner

DEVICE FOR CHANGING A COMPRESSION RATIO OF A CYLINDER UNIT OF A RECIPROCATING PISTON COMBUSTION ENGINE

CROSS-REFERENCE TO RELATED APPLICATIONS

This application is the U.S. National Phase of PCT Appln. No. PCT/DE2015/200371 filed Jun. 16, 2015, which claims priority to DE Patent Application No. 10 2014 216 533.4 filed Aug. 20, 2014, the disclosures of which are incorporated in their entirety by reference herein.

TECHNICAL FIELD

This disclosure relates to a device for changing a compression ratio of a cylinder unit of a reciprocating piston combustion engine, comprising an eccentric bushing which is rotatably arranged in a receiving bore hole of a bearing eye of a connecting rod (or "conrod"), said conrod bearing eye being formed by a conrod upper part and a conrod lower part, and which surrounds a crankpin of a crankshaft, whereby the eccentric bushing that is rotatably guided in the receiving bore hole is preferably lockable in two positions which are offset from one another by preferably approximately 180° in the circumferential direction of the eccentric bushing.

BACKGROUND

The compression ratio of a reciprocating piston combustion engine E is used to describe the ratio of the volume of the entire cylinder chamber to the volume of the compression chamber. Through an increase in the compression ratio, the efficiency of the reciprocating piston combustion engine may be increased and the fuel consumption my thus be reduced overall. With reciprocating piston combustion engine with external ignition, their knocking tendency however increases with the increase of the compression ratio in full-load operation. The knocking is an uncontrolled self-ignition of the air-fuel mixture. On the other hand, the compression ratio during partial-load operation, during which the filling is lower, could be increased for the improvement of the respective partial-load efficiency, without the previously mentioned knocking occurring. The result is thus that it is expedient to operate the reciprocating piston combustion engine in partial-load operation with a relatively high compression ratio and in full-load operation with a compression ratio reduced towards it.

A change of the compression ratio is also particularly advantageous for loaded reciprocating piston combustion engines with external ignition as a lower compression ratio is stipulated with them in view of the load, whereby the compression must be increased to improve the thermodynamic efficiency in unfavorable areas of a respective engine map. There is furthermore the possibility to generally change the compression ratio depending on more operating parameters of the reciprocating piston combustion engine, for example like with running conditions of the motor vehicles, operating points of the internal combustion engine, signals of a knock sensor, emission values, etc.

Devices are known from the state of the art, among other things, which perform an adjustment in distance between a crankpin, a crankshaft, and a piston pin. It thereby pertains to different devices, namely to such that perform a change in position of the conrod as opposed to the crankshaft.

A device for changing a compression ratio of a reciprocating piston combustion engine in the type described in the generic claim of patent claim 1 is known from the DE 197 03 948 A1. According to that, a conrod device in the area of its conrod bearing eye assumes an eccentric bushing. It is guided to an inside wall of the conrod bearing eye with its cylindrical outer circumferential surface and is supposed to be formed as a plain bearing. On its inside circumferential surface that is eccentrically offset to the outer circumferential surface, the bushing is guided sliding on a crankpin of a crankshaft of the reciprocating piston combustion engine. A rotation of the bushing in the bore of the conrod bearing eye shall be automatic. This movement of the eccentric bushing shall be triggered by outside forces resulting from the rotation of the crankshaft, respectively the conrod movement. The eccentric bushing is furthermore provided with flanges on its ends which overlap the conrod bearing eye and have locking recesses offset by 180° in peripheral direction. A locking member intended on the conrod is activated through a cam segment in such a way that it optionally engages in the one or the other locking recess after a respective twist of the bushing.

A device for changing the compression ratio of a reciprocating piston combustion engine is furthermore known from DE 10 2008 032 665 A1, in which an eccentric bushing is also supposed to be arranged on the respective crankpin of the crankshaft. This eccentric bushing has flanges on tis ends that are provided with external teeth. Through these, and through gears that are arranged in the webs of the crankshaft, and which are arranged to the external teeth at the drive and the output side, a mechanical drive system is created whereby adjusting shafts are arranged between the gears that run coaxially to the crankshaft. The gears shall thereby be driven via free runs from the adjusting shafts.

SUMMARY

It is the task of the present disclosure to effect a specific torsion of the eccentric bushing in the bore of the conrod bearing eye between the locking positions.

Advantageous embodiments are portrayed in the patent claims depending on it, which in their own right, or used in different combinations, may represent an aspect of the invention together.

According to that, a free wheel is arranged between an outer casing surface of the eccentric bushing and the location hole. This free wheel prevents that the eccentric bushing is offset in short turning motions in opposite directions of rotation due to the inertia forces or gas forces as well as the moments created by the rotating crankpin. A change of rotation can result in the area of the top or bottom dead center of the working piston connected with the conrod, as moments work on the eccentric bushing, which can assume both positive and negative values. The consequence of this is that the respective eccentric bushing is not rotated into its other position serving the change of the compression ratio of the position serving the cylinder unit. This ultimately results in that some of the cylinder units are operated with a high and some with a low compression ratio. These disadvantages can be eliminated according to the disclosure by locating the free wheel between the eccentric bushing and the conrod bearing eye to allow one specific rotation in one direction of rotation.

On the other hand, according to DE 197 03 948 A1, the eccentric bushing is arranged directly in the location hole of the conrod bearing eye. There is therefore no specific rotation of the bushing in one direction of rotation. Free wheels are however intended in the arrangement according to DE 10 2008 032 665 A1, but these are located between the individual actuating shafts and the driven gear wheels.

In another embodiment of the invention, the free wheel is supposed to be formed as a roller free wheel. The respective clamping rollers are formed cylindrically and work together with clamping ramps that are intended on the outer casing surface of the eccentric bushing. Provided that the barrier effect is sufficient, balls can also be intended instead of the cylindrical clamping rollers. Alternatively to the use of a roller free wheel, there is also the possibility to intend for a clamping body freewheel, in which both the inside locking surface and the outer locking surface would be formed cylindrically. The outer casing surface of the eccentric bushing therefore does not need to be provided with clamping ramps like with the roller free wheel.

When using a roller free wheel it is furthermore suggested that its clamping rollers are guided in a cage and that the eccentric bushing and the cage consist of two half shells. With a half-shell-like formation of the two parts of the cage, these can be provided dovetail-like on the one hand and with slots on the other hand on its two ends each. In an assembled condition of the cage, the dovetail-like end pieces of the one half shell reach into the respective opening of the other half-shell so that the half shells are guided to one another. The cage can also be formed in one part and can thereby only be slit in one area so that it can be bent upwards for the assembly on the eccentric bushing. It thereby may have a bending point and a cage lock.

It is also suggested that roller bearings or plain bearings are formed on both sides, above which the eccentric bushing is stored across from the receiving bore hole. The eccentric bushing shall thereby be guided in the unlocked direction of rotation in the receiving bore hole so smoothly that the respective adjustment can take place without any special means during the operation of the reciprocating piston combustion engine.

In another embodiment of the invention, provision is made for that the eccentric bushing is provided with boards running radially towards the outside, which are guided in a sliding fashion on both axially directed front surfaces of the conrod upper part and the conrod lower part. On these boards that have the shape of circular ring-shaped flanges, lock openings can be formed that are offset by 180° to each other on the circumference of the eccentric bushing. A locking element is thereby arranged movable in a pilot hole running in parallel to the receiving bore hole of the conrod bearing housing, which may optionally be slid into one of the lock openings. This locking is usually done in the two positions of the eccentric bushing for a low and a high compression ratio.

Alternatively to the previously listed embodiment of the freewheel as a roller freewheel or a clamping body freewheel, it is furthermore intended to form it as a wrap-spring freewheel, whereby one end of at least one wrap spring is coupled to the conrod bearing eye. This end of the wrap spring can be fixated in the parting plane between the conrod upper part and the conrod lower part. The other end of the wrap spring is slid onto the eccentric. It is thereby important that the screw-shaped aligned wrap spring can be installed above the crankpin or the offset of the crankshaft. This is done by that the cross section of the wrap spring is chosen in such a way that the rectangular tape in the direction to be bent open is executer weaker and can thus be brought across the crankpin. Once the first wind has been slid over the crankpin, the remaining wrap spring can be wound up on the crankpin. In comparison with a positive-locking, respectively force-locking freewheel, the wrap spring has the advantage that the wrap spring can assume a clearly higher overload.

Finally it is intended that the wrap-spring freewheel is arranged in a ring-shaped inclusion that usually extends within the conrod upper part and the conrod lower part and that has a rectangular cross section. Alternatively to that, there is also the possibility to intend for a respectively formed inclusion in the eccentric bushing. The eccentric bushing can also be formed in connection with this wrap-spring freewheel so that it can be set by means of axially, therefore locking means that are moved in parallel to the crankpin or radially to it in two positions offset from each other by 180° across from the conrod bearing eye.

This disclosure is not restricted to the listed combination of features of the claims. There are furthermore more possibilities to combine individual features with each other, especially when they are the result from the patent claims, from the following description of the execution examples or from the figures directly. The reference of the patent claims to the figures shall not restrict the scope of protection of the patent claims due to the use of reference signs in any case either.

BRIEF DESCRIPTION OF THE DRAWINGS

For a further explanation of embodiments of the invention, the drawing is referred to representing several different execution examples in a simplified manner. The following is shown:

FIG. 10 a perspective representation to explain the assembly of a wrap-spring on a crankpin of a crankshaft, FIG. 11 a wrap-spring freewheel made from two wrap-springs wrapped inside each other, and FIG. 12 in a longitudinal section, a partial view of an eccentric bushing that is provided with a double winded wrap-spring freewheel, equipped with roller bearings on its two sides.

DETAILED DESCRIPTION

Figure 1:
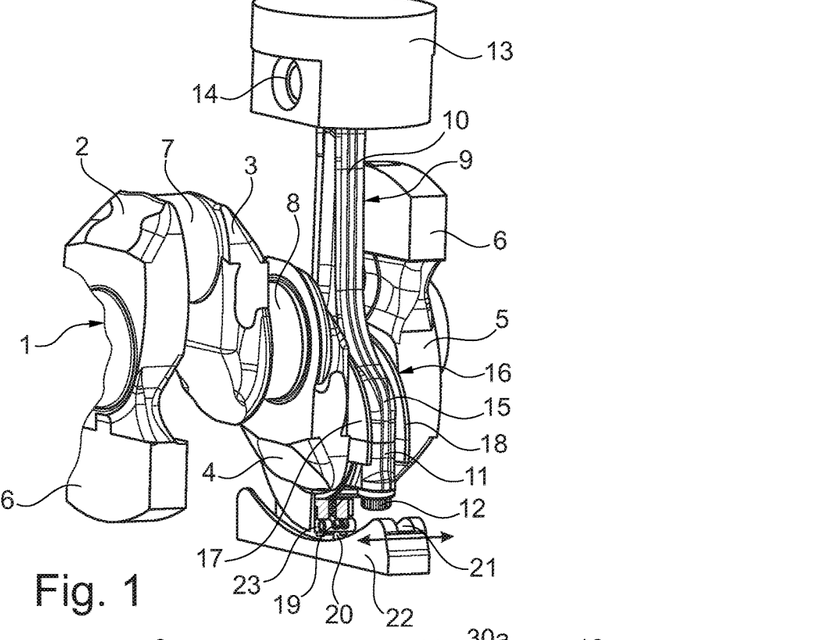
FIG. 1 as a perspective representation, a partial view of a crankshaft with a conrod arranged on a crankpin recording a working piston, which is cut in the area of its conrod lower part, FIG. 2 a partial view of the conrod with a partial section through a crankpin and a cam disc, FIG. 3 a perspective representation of an eccentric bushing that includes a roller freewheel on an outer casing surface, FIG. 4 an eccentric bushing with a roller freewheel, FIG. 5 a roller freewheel that has roller bearings arranged to it on both sides, FIG. 6 a perspective representation of the eccentric bushing provided with the roller freewheel, FIG. 7 a perspective representation of a cage intended for the roller freewheel, FIG. 7A a perspective representation of another version of a cage intended for the roller freewheel, FIG. 7B an enlarged section VII b in FIG. 7A, FIG. 7C an enlarged section VII c in FIG. 7A, FIG. 8 as perspective representation, a conrod cut sideways, whereby a wrap-spring freewheel is arranged between a conrod eye and an eccentric bushing, FIG. 9 an enlarged representation of the conrod bearing eye of the conrod represented in FIG. 7

A crankshaft of a reciprocating piston combustion engine is designated 1 in FIG. 1, of which only one partial section is represented consisting of four crank webs 2, 3, 4, and 5. The crank webs 2 and 5 are thereby provided with counterweights 6 for mass balance and insofar differ from the crank webs 3 and 4. A crankpin 7 is furthermore formed between the crank webs 2 and 3 for the inclusion of a connecting rod ("conrod") not explained in detail, while the crank webs 3 and 4 run on both sides of a main bearing pin 8, above which the crankshaft 1 is stored in a crankcase of the reciprocating piston combustion engine not explained in detail. Finally, a crankpin is intended again between the two crank webs 4 and 5, which is however not visible in this representation as a conrod is arranged on it. Due to the offset of the crankshaft 1, this non-visible crankpin assumes a different position compared to the crankpin 7.

This conrod 9 consists of a conrod upper part 10 and a conrod lower part 11 that are connected with each other by screws 12. The conrod upper part 10 includes a working piston 13 on its end facing away from the conrod lower part 11, which is attached to the conrod upper part by means of a piston pin 14 with a piston pin bearing not explained in detail as well as a conrod eye. A parting plane 15 between the conrod upper part 10 and the conrod bottom part 11 runs through a conrod bearing eye that is also not visible in the perspective representation of FIG. 1, as already stated, as the conrod 9 is installed on the respective crankpin of the crankshaft 1.

An eccentric bushing 16 is arranged in this conrod bearing eye 16 that has boards 17 and 18 running outwards. The eccentric bushing 16 is guided on the face through the boards 17 and 18 both on the conrod upper part 10 and the conrod bottom part 11. It can be seen from the partial section through the conrod bottom part 11 according to FIG. 1 that a cylindrical locking element 19 is arranged moveable axially, therefore in parallel to the longitudinal axis of the crankshaft 1 in it. This locking element 19 has a radial running cylindrical carrier 20, which engages in a carrier groove 21 of a cam disc 22 at times, meaning in the area of a bottom dead center of the working piston 13. This cam disc 22 arranged in an oil sump of the reciprocating piston combustion engine is arranged moveably in longitudinal direction of the crankshaft 1 and is moved accordingly by means of adjusting means not described in more detail. It can thus move the locking element 19 in the direction of one of the two boards 17 or 18 through its carrier groove 21 recording the carrier 20. The carrier groove 21 and be widened in the inlet area for the carrier 20 and can taper off continuously to the discharge area to offset possible tolerances.

There is a locking bore in each of the boards that the locking element 19 can be moved into. FIG. 1 has the locking element 19 with its respective end in a locking hole 23 of the board 17. The respective position of this locking hole 23 of board 17 to a locking bore intended in board 18 will still be addressed in connection with the following FIGS. 3, 4, and 6.

Figure 2:
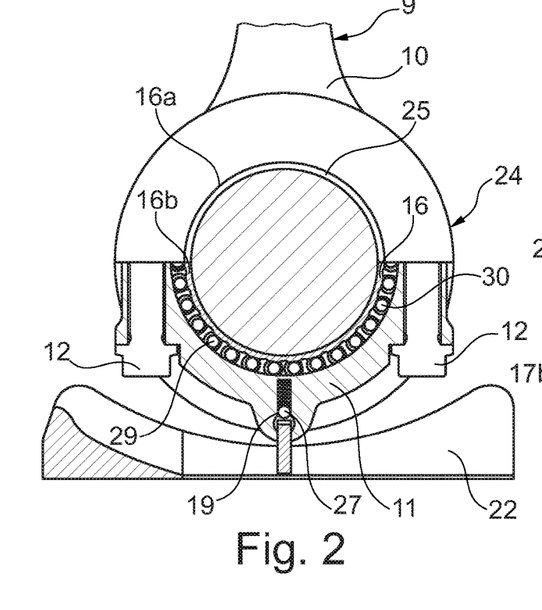

A section of the conrod 9 is represented in FIG. 2 in the area of a conrod bearing eye 24, which is formed by a half-shell formation of the end section of the conrod upper part 10 and the entire conrod lower part 11. The conrod upper part 10 and the conrod lower part 11 are fixated to each other with screws 12 and jointly form a location hole 25. The eccentric bushing 16 is arranged in this location hole 25, which is thus guided rotational in the location hole 25. The eccentric bushing 16 also consists of two half shells 16a and 16b, whereby the two boards 17 and 18 of the eccentric bushing 16 are thus also arranged to these half shells accordingly, and which are executed by means of circular ring sections described with 17a, 17b as well as 18a and 18b. But only the board 17 is visible in FIG. 2 so that also only half of the circular ring section 17a is shown.

For clarification of the arrangement, the conrod bearing eye 24 is represented as a half-section in FIG. 2 so that the locking element 19 with the carrier is visible in its arrangement in the conrod lower part 11. The locking element 19 has a snap contour that works together with a spring-loaded locking pin 27. The arrangement of the cam disc and its interaction with the carrier is also shown in FIG. 2.

Figure 3:
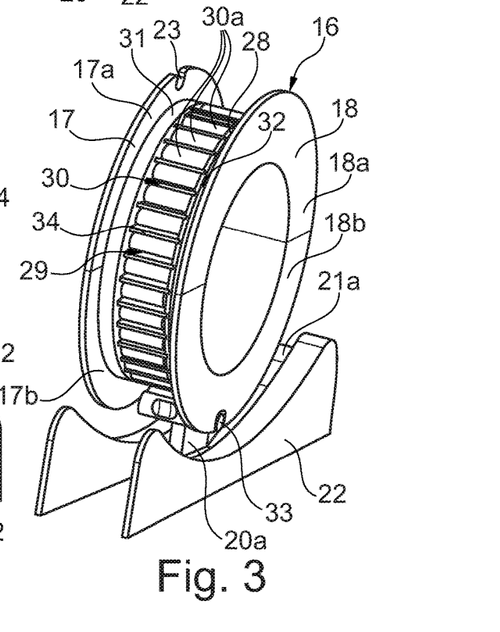

As is furthermore shown in FIG. 3, a freewheel 29 is arranged on an outer casing surface 28 of the eccentric bushing 16 that is formed as a roller freewheel in this case. For this purpose, the outer casing surface 28 of the eccentric bushing 16 is provided with clamping ramps that run outwards in a radially angular manner, and which are not displayed in detail in FIG. 3. This representation furthermore shows that the eccentric bushing 16 is provided with sliding surfaces 31 and 32 on axial sections of its outer casing surface 28 to form a plain bearing. The two boards 17 and 18 that together with the hollow cylindrical section of the eccentric bushing 16 are halved into partial sections 17a and 17b as well as 18a and 18b have locking holes 23 and 33 that are offset to each other by 180°. Clamping rollers 30a of the roller freewheel are guided rotationally in a cage 34. The embodiment according to FIG. 3 furthermore has a carrier 20a formed with a rectangular cross section. The cam disc 22 in this case is provided with a carrier groove that is formed relatively wide in the inlet area for the carrier 20a and which continuously tapers off to the outlet area so that tolerances can be offset.

The eccentric bushing 16, as already explained in connection with FIG. 2, will be arranged in the location hole 25 of the conrod bearing eye 24, whereby the boards 17 and 18 are guided sliding on the front faces of the conrod bearing eye 24. The eccentric bushing 16 is also guided through the sliding surfaces 31 and 32 as well as the roller free wheel 30 in the location hole 25. The roller freewheel ensures that a rotation of the eccentric bushing 16 across from the conrod bearing eye 24 is only possible in one direction of rotation, while the roller freewheel 30 blocks the rotary motion in the other direction of rotation.

Figure 4:
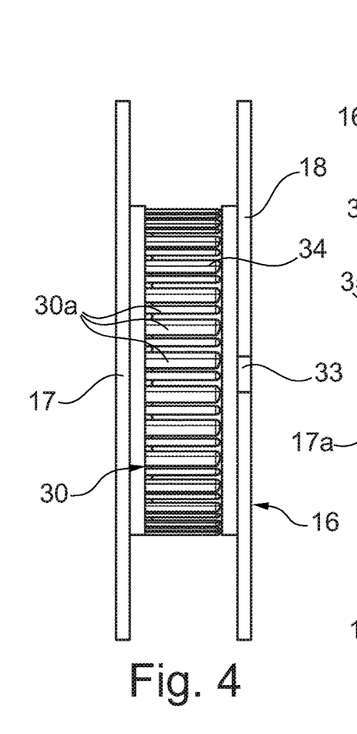

The arrangement of the roller freewheel 30 comprising the cage 34 on the outer casing surface 28 of the eccentric bushing 16 is shown once more in FIG. 4. The eccentric bushing 16 is thereby shown in a position, in which the locking hole is visible.

Figure 5:
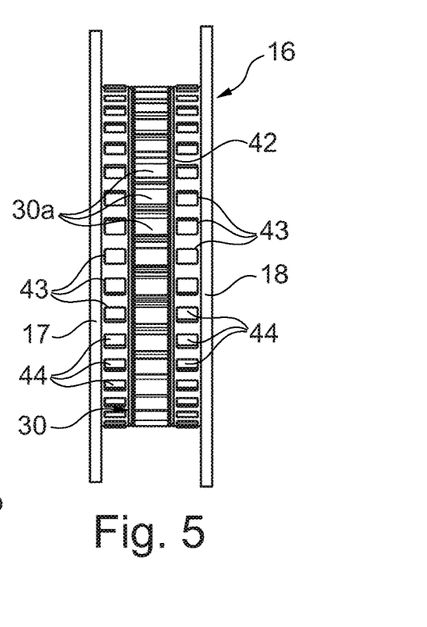

An alternative embodiment of a cage 42 is represented in FIG. 5, which is formed in a middle area for the inclusion of clamping rollers 30a of the roller freewheel 30 and which has pockets 43 for the inclusion of cylindrical rolling elements next to this area. A roller bearing is thus created on both sides of the roller freewheel.

Figure 6:
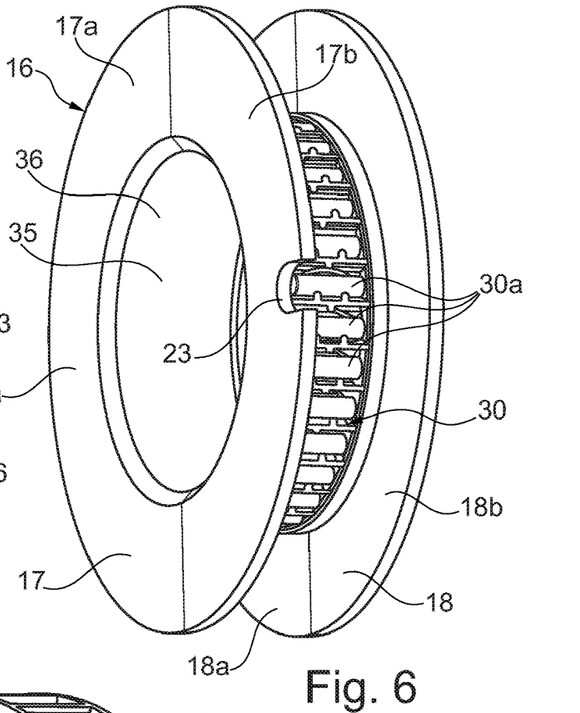

With regard to the formation of the eccentric bushing, FIG. 6 is referred to, which shoes it in a different perspective, in which a locking hole 23 of the board 17 is visible. The eccentric bushing 16 can be formed as a plain bearing 36 on its inner casing surface 35; above which the conrod 9 is arranged on the respective crankpin of the crankshaft 1.

Figure 7:
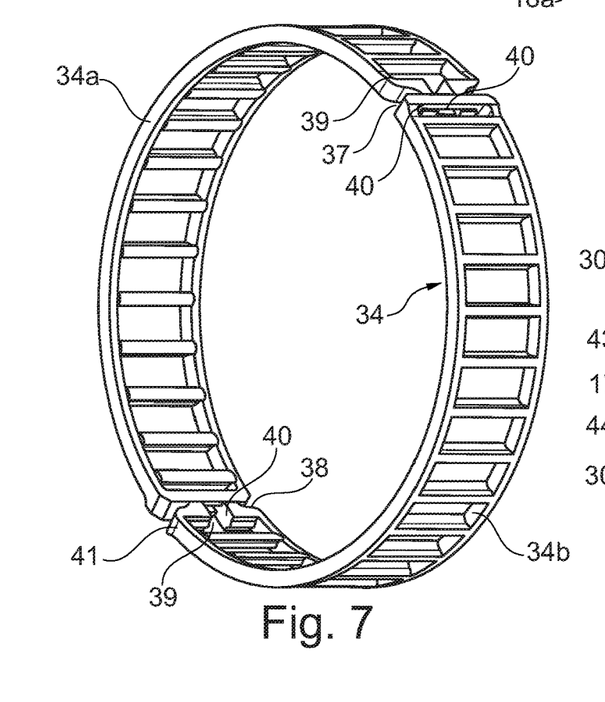

FIG. 7 shows the cage 34 that comprises the cage halves 34a and 34b and which is intended for the inclusion of the clamping rollers 30a of the roller freewheel. The cage ends are thereby guided together through cage locks 37 and 38. Each of these cage locks 37 or 38 consists of an end piece 39 formed as a dovetail and an end piece 41 comprising a slot 40. The cage halves 34a and 34b can thus perform radial compensation movements to one other.

Figure 7A:
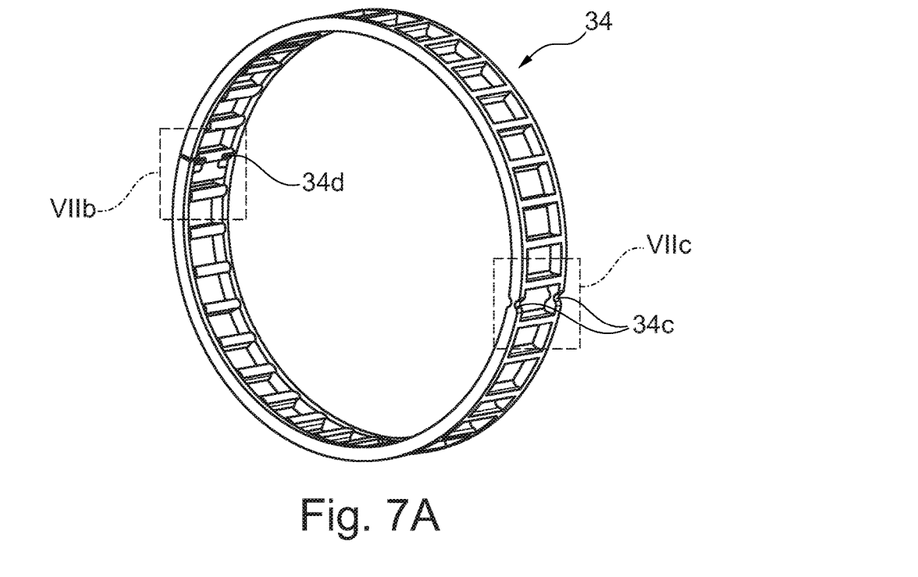
Figure 7B:
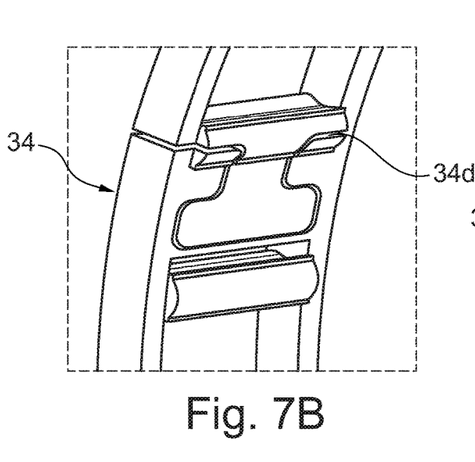
Figure 7C:
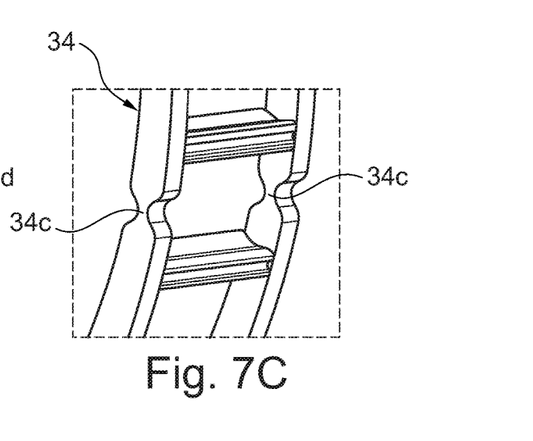

Another embodiment of the cage 34 is represented in FIG. 7A in connection with the FIGS. 7B and 7C. This cage 34 is formed as one piece and has a bending point 34c and a cage lock 34d.

Figures 8, 9, 10, 11, 12:
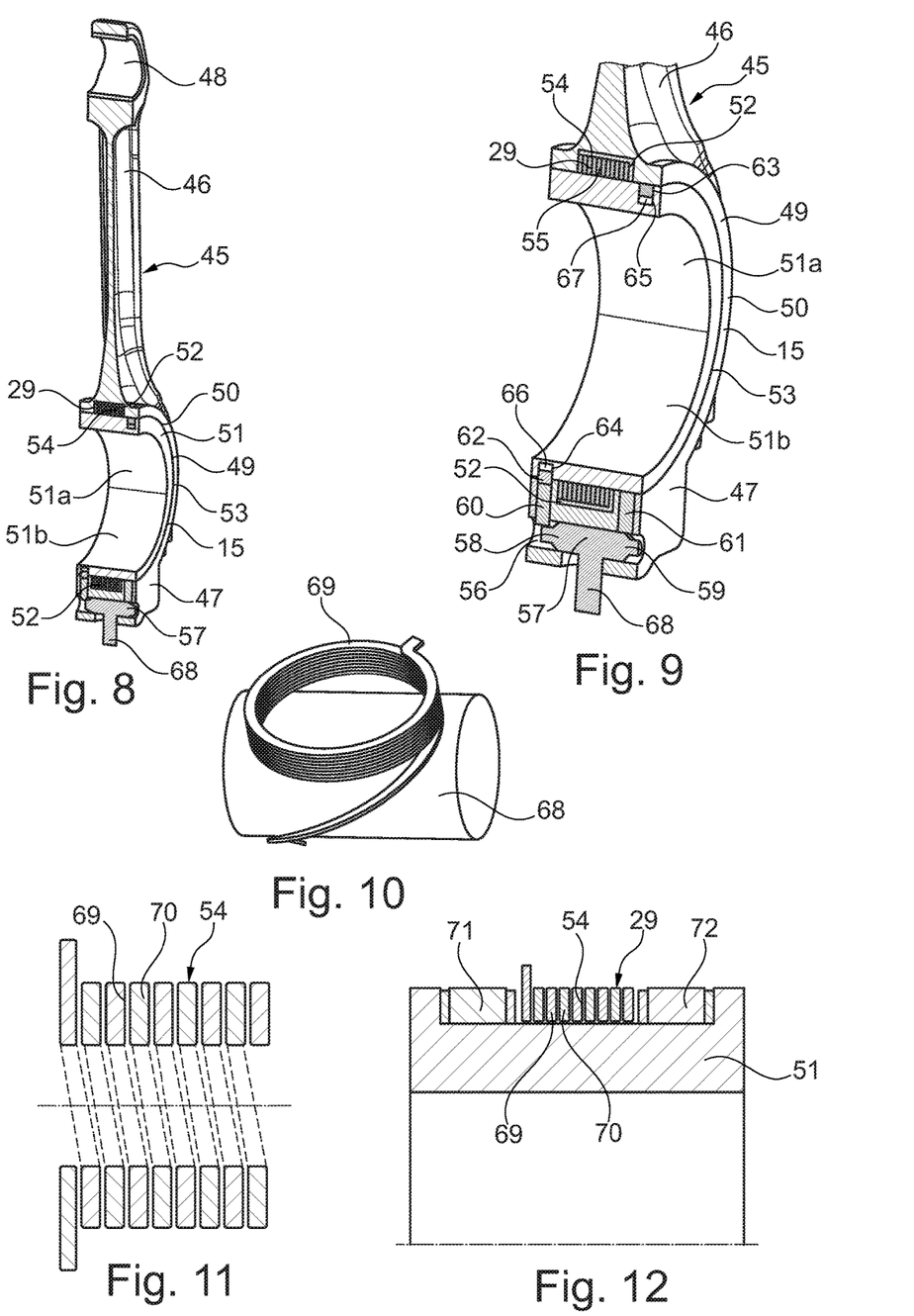

According to another embodiment, per FIG. 8, a conrod 45 shall consist of a conrod upper part 46 and a conrod bottom part 47, whereby a piston pin bearing 48 is formed on one end of the conrod upper part 46. The conrod 45 further comprises a conrod bearing eye 49, in whose receiving bore hole an eccentric bushing is rotatably mounted. Both the conrod upper part 46 and the conrod lower part 47 are provided with a recess 52 comprising a rectangular cross section, which consequently encompasses the eccentric bushing 51 on an outer casing surface 53.

As can be seen from FIG. 8 in connection with FIG. 9, a wrap-spring freewheel 54 is arranged within this recess, which thus wraps the eccentric bushing 51 on its outer casing surface 53. The respective wrap spring 55 is thereby fixated on the conrod bearing eye 49 on its one end. A respective wrap-spring freewheel 54 enables a rotation of the eccentric bushing 51 in one direction of rotation across from the conrod bearing eye 49 and prevents a rotation in the other direction of rotation. The eccentric bushing 51 is formed hollow cylindrical overall in this case, therefore without ribs.

A pilot hole 56 is intended in the conrod lower part 47, in which a sliding guideway 57 is arranged. The sliding guideway 57 has end sections 58 and 59, in which it is provided with a recess or a reduced diameter. Actuating pins 60 and 61 are furthermore provided for in the bottom part of the piston, which run radially to the sliding guideway 57. These actuating pins 60 and 61 work together with tie pins 62 and 63, which are arranged in radial lock holes 64 and 65 of the eccentric bushing 51. The lock holes 65 and 65 that are located on circumferential tracks of the eccentric bushing 51, which are offset to each other axially, are thereby preferably formed as bored holes, in which the tie pins are supported through springs 66, 67. The sliding guideway 57 thereby also comprises a carrier, which is activated through a cam disc that is movable in axial direction in the same way as is portrayed in FIG. 1.

When the sliding guideway 57 assumes a position, in which the respective actuating pin 60 or 61 is located in one of the end sections 58 or 59, the respective tie pin 62 or 63 can exit the lock hole 64 or 65 and can consequently lock the eccentric bushing 51 across from the conrod bearing eye 49. According to FIG. 9, this is the case for the tie pin 62 exiting from the lock hole 64.

The additional FIG. 10 shows a shaft stub, by means of which the assembly of a wrap-spring 69 on a crankpin is supposed to be shown. An end of the wrap spring is thereby guided around the shaft stub and is then continuously wrapped around the shaft stub 68. As the eccentric bushing 51 consists of half shells 51a and 51b in accordance with FIGS. 8 and 9, and they don't have a rib, these half shells 51a and 51b can subsequently be inserted between the wrap spring 69 and the respective crankpin.

According to FIG. 11 provision is made for that the wrap-spring freewheel 54 has another wrap spring beside the already named wrap spring 69, and that these two wrap springs 69 and 70 are wound up inside each other in spiral form.

According to FIG. 12, the eccentric bushing 51 is provided with a double-wound wrap-spring freewheel 54, beside which roller bearings 71 and 72 are intended on each side. Plain bearings may also be provided for instead of the two rolling bearings.

LIST OF REFERENCE SIGNS

1 Crankshaft
2 Crank web
3 Crank web
4 Crank web
5 Crank web
6 Counterweight
7 Crankpin
8 Main bearing pin
9 Conrod
10 Conrod upper part
11 Conrod lower part
12 Screw
13 Working piston
14 Piston pin
15 Parting plane
16 Eccentric bushing
16a Half shell of 16
16b Half shell of 16
17 Board
17a Section of 17
17b Section of 17
18 Board
18a Section of 18
18b Section of 18
19 Locking element
20 Carrier
21 Carrier groove
22 Cam disc
23 Locking holes
24 Conrod bearing eye
25 Location hole
26 Snap contour
27 Locking pin
28 Outer casing surface of 16
29 Freewheel
30 Roller freewheel
30a Clamping rollers of 30
31 Sliding surface
32 Sliding surface
33 Locking hole
34 Cage
34a Half shell of 34
34b Half shell of 34
34c Bending point of 34
34d Cage lock
35 Inner casing surface
36 Plain bearings
37 Cage lock
38 Cage lock
39 Dovetail-like end piece of 34a and 34b
40 Slot
41 End piece of 34a and 34b
42 Cage
43 Pockets
44 Cylindrical rolling elements
45 Conrod
46 Conrod upper part
47 Conrod lower part
48 Piston bin bearings
49 Conrod bearing eye
50 Receiving bore hole
51 Eccentric bushing
52 Recess
53 Outer casing surface
54 Wrap-spring freewheel 55 Wrap-spring
56 Pilot hole
57 Sliding guideway
58 End section
59 End section
60 Actuating pin
61 Actuating pin
62 Tie pin
63 Tie pin
64 Lock hole
65 Lock hole
66 Spring
67 Spring
68 Shaft stub
69 Wrap spring
70 Wrap spring
71 Roller bearing
72 Roller bearing

The invention claimed is:

1. A device for changing a compression ratio of a cylinder unit of a reciprocating piston combustion engine, comprising an eccentric bushing rotatably arranged in a receiving bore hole of a connecting rod bearing eye of a connecting rod, said connecting rod bearing eye being formed by an upper part and a lower part, and which surrounds a crankpin of a crankshaft, wherein the eccentric bushing is rotatably guided in the receiving bore hole and is lockable in two positions which are offset from one another by approximately 180° in a circumferential direction of the eccentric bush wherein a freewheel is arranged between an outer casing surface of the eccentric bushing and the receiving bore hole of the connecting rod bearing eye.

2. The device according to patent claim 1, wherein the freewheel is formed as a roller freewheel.

3. The device according to patent claim 1, wherein the freewheel is formed as a clamping body freewheel.

4. The device according to claim 2, wherein the roller freewheel includes clamping rollers guided in a cage and that clamping ramps on the outer casing surface of the eccentric bushing.

5. The device according to claim 1, wherein rolling bearings or plain bearings are formed on both sides of the freewheel above which the eccentric bushing is arranged across from the location hole.

6. The device according to claim 1, wherein the eccentric bushing is provided with boards running outwards radially, which are guided slidingly on both axially directed front faces of the upper part and the lower part.

7. The device according to claim 1, wherein the freewheel is formed as a wrap-spring freewheel, wherein one end of at least one wrap-spring is coupled with the connecting rod bearing eye.

8. The device according to claim 7, wherein the end of the at least one wrap spring is attached in the parting plane between the upper part and the lower part.

9. The device according to claim 7, wherein the wrap-spring freewheel includes two wrap-springs, with spiral-like windings run parallel to one another.

10. The device according to claim 7, wherein the wrap-spring freewheel is arranged in a ring-shaped recess that extends within the upper part and the lower part and that includes a rectangular cross section.

11. An assembly for changing a compression ratio of a cylinder unit of a combustion engine, the device comprising:
a connecting rod having an inner surface defining an opening configured to receive a crankpin of a crankshaft;
a bushing rotatably arranged in the opening and having an outer surface, wherein the bushing includes one or more pockets configured to receive a locking member to lock the bushing and inhibit rotation of the bushing; and
a freewheel arranged between the outer surface of the bushing and the inner surface of the connecting rod, the freewheel contacting the bushing to enable rotation of the bushing in a first direction while preventing rotation of the bushing in a second direction.

12. The assembly of claim 11, wherein the one or more pockets is a plurality of pockets each configured to receive the locking member.

13. The assembly of claim 12, wherein the pockets are separated by 180 degrees about the bushing from one another.

14. The assembly of claim 12, wherein the bushing includes a pair of opposing flanges and the freewheel is disposed between the flanges, wherein each flange includes one of the plurality of pockets.

15. The assembly of claim 12, wherein the locking device is selectively received by the plurality of pockets to selectively lock the bushing.

16. The assembly of claim 11, wherein the connecting rod is attachable to a crankshaft extending along an axis, and the locking member is moveable into and out of the one or more pockets in a direction parallel to the axis.

* * * * *